(12) United States Patent
Wang et al.

(10) Patent No.: US 12,133,240 B2
(45) Date of Patent: Oct. 29, 2024

(54) DATA CHANNEL TRANSMISSION BANDWIDTH DETERMINATION METHOD AND APPARATUS, NETWORK SIDE DEVICE AND TERMINAL

(71) Applicant: DATANG MOBILE COMMUNICATIONS EQUIPMENT CO., LTD., Beijing (CN)

(72) Inventors: Lei Wang, Beijing (CN); Yanping Xing, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 550 days.

(21) Appl. No.: 17/599,992

(22) PCT Filed: Mar. 27, 2020

(86) PCT No.: PCT/CN2020/081675
§ 371 (c)(1),
(2) Date: Sep. 29, 2021

(87) PCT Pub. No.: WO2020/200090
PCT Pub. Date: Oct. 8, 2020

(65) Prior Publication Data
US 2022/0150920 A1    May 12, 2022

(30) Foreign Application Priority Data

Mar. 29, 2019   (CN) .......................... 201910253281.4

(51) Int. Cl.
*H04W 72/52*   (2023.01)

(52) U.S. Cl.
CPC .................................. *H04W 72/52* (2023.01)

(58) Field of Classification Search
None
See application file for complete search history.

(56) References Cited

U.S. PATENT DOCUMENTS

| 2015/0009939 A1 | 1/2015 | Zhang et al. |
| 2018/0279289 A1 | 9/2018 | Islam et al. |
| 2019/0327718 A1 | 10/2019 | Fang et al. |

(Continued)

FOREIGN PATENT DOCUMENTS

| CN | 102547872 A | 7/2012 |
| CN | 103327615 A | 9/2013 |

(Continued)

OTHER PUBLICATIONS

International Search Report from PCT/CN2020/081675, dated Jun. 30, 2020, with English translation from WIPO, all pages.

(Continued)

*Primary Examiner* — Phirin Sam
(74) *Attorney, Agent, or Firm* — Ladas & Parry, LLP

(57) ABSTRACT

This disclosure provides a data channel transmission bandwidth determination method and apparatus, a network side device and a terminal. The data channel transmission bandwidth determination method includes: transmitting, to a terminal, scheduling information for scheduling data channel transmission; where the scheduling information includes data channel transmission bandwidth indication information.

16 Claims, 2 Drawing Sheets

Transmitting, to a terminal, scheduling information for scheduling data channel transmission; where the scheduling information includes data channel transmission bandwidth indication information /11

(56) References Cited

U.S. PATENT DOCUMENTS

| | | |
|---|---|---|
| 2020/0163066 A1 | 5/2020 | Jiang |
| 2023/0328699 A1* | 10/2023 | Zhou .................... H04L 5/0058 370/252 |
| 2024/0032048 A1* | 1/2024 | Jeon ........................ H04L 5/00 |
| 2024/0179645 A1* | 5/2024 | Kwak ................. H04B 7/0632 |

FOREIGN PATENT DOCUMENTS

| | | |
|---|---|---|
| CN | 107734665 A | 2/2018 |
| CN | 107872779 A | 4/2018 |
| CN | 108738113 A | 11/2018 |
| WO | 2018/171413 A1 | 9/2018 |
| WO | 2019/017645 A1 | 1/2019 |

OTHER PUBLICATIONS

Written Opinion of the International Searching Authority from PCT/CN2020/081675, dated Jun. 30, 2020, with English translation from WIPO, all pages.

International Preliminary Report on Patentability from PCT/CN2020/081675, dated Sep. 28, 2021, with English translation from WIPO, all pages.

Extended European Search Report for European Patent Application 20784000.0, issued on May 4, 2022.

* cited by examiner

DATA CHANNEL TRANSMISSION BANDWIDTH DETERMINATION METHOD AND APPARATUS, NETWORK SIDE DEVICE AND TERMINAL

CROSS-REFERENCE TO RELATED APPLICATIONS

The present application is a U.S. national phase application of a PCT Application No. PCT/CN2020/081675 filed on Mar. 27, 2020, which claims priority to Chinese patent application No. 201910253281.4 filed in China on Mar. 29, 2019, the disclosures of which are incorporated herein by reference in their entireties.

TECHNICAL FIELD

The present disclosure relates to the field of communication technologies, and in particular, to a data channel transmission bandwidth determination method and apparatus, a network side device and a terminal.

BACKGROUND

In a satellite communication system, in order to reduce the peak-to-average power ratio (PAPR), the DFT-s-OFDM (discrete Fourier transform spread orthogonal frequency division multiplexing) waveform is adopted for the downlink. However, generation of the DFT-s-OFDM waveform requires continuous resource allocation. A network side may simultaneously transmit multiple physical downlink shared channels (PDSCH) in one slot. A control signaling for scheduling a PDSCH only contains frequency domain resource allocation information of the PDSCH. Therefore, a terminal, when receiving a single carrier waveform, cannot determine the size of the bandwidth on which the generation of the single carrier waveform is based. Thus, a reception failure may result.

Specifically, because a base station can transmit multiple PDSCHs in one slot, the waveform is generated by performing a transform precoding operation based on transmission bandwidths of the multiple PDSCHs. As a result, when the terminal receives a downlink data channel and performs a reverse operation of the transform precoding, the terminal needs to know a total bandwidth occupied by the multiple PDSCHs transmitted simultaneously. However, this information cannot be obtained from the DCI (downlink control information) corresponding to the PDSCHs.

It can be seen from the above that a satellite communication system adopts the DFT-s-OFDM waveform for the downlink. When multiple downlink data channels (i.e., PDSCHs) exist simultaneously, and frequency domain resources of the multiple downlink data channels are continuous or discontinuous, the conventional solution suffers from a problem that the terminal side cannot know the transmission bandwidths of the data channels, which leads to a data reception failure.

SUMMARY

The present disclosure is directed to provide a data channel transmission bandwidth determination method and apparatus, a network side device and a terminal, so as to solve the problem in the related art that the terminal side cannot know the data channel transmission bandwidth when multiple downlink data channels coexist and frequency domain resources of the multiple downlink data channels are continuous or discontinuous.

In order to solve the above technical problem, an embodiment of the present disclosure provides a data channel transmission bandwidth determination method, performed by a network side device, including:
transmitting, to a terminal, scheduling information for scheduling data channel transmission;
where the scheduling information includes data channel transmission bandwidth indication information.

Optionally, there is a first correspondence between the data channel transmission bandwidth indication information and a data channel transmission bandwidth size, and there is a second correspondence between the data channel transmission bandwidth size and a data channel transmission bandwidth position.

Optionally, before the transmitting, to the terminal, the scheduling information for scheduling the data channel transmission, the method further includes: agreeing on the first correspondence and the second correspondence with the terminal.

Optionally, the transmitting, to the terminal, the scheduling information for scheduling the data channel transmission includes: transmitting, to the terminal, the scheduling information for scheduling the data channel transmission according to the first correspondence and the second correspondence.

Optionally, the data channel transmission bandwidth indication information includes N bits, where N is a positive integer greater than 1; the data channel transmission bandwidth indication information is to indicate $2^N$ types of different status information, where each type of status information corresponds to one data channel transmission bandwidth size, or each type of status information corresponds to one data channel transmission bandwidth size and one data channel transmission bandwidth position.

Optionally, an indication field of the data channel transmission bandwidth indication information is located before a frequency domain resource indication field.

Optionally, the data channel transmission bandwidth indication information is used for indicating the data channel transmission bandwidth size.

Optionally, the method further includes:
transmitting frequency domain resource allocation information to the terminal;
where the frequency domain resource allocation information includes an index of a resource block in a frequency domain resource allocated to the data channel.

Optionally, the method further includes: in a case that the index of the resource block occupies at least two data channel transmission bandwidth positions in the second correspondence, adjusting the data channel transmission bandwidth size according to the data channel transmission bandwidth positions occupied by the index of the resource block, and determining a data channel transmission bandwidth position corresponding to the adjusted data channel transmission bandwidth size.

Optionally, the second correspondence includes determination information of the data channel transmission bandwidth position corresponding to the data channel transmission bandwidth size.

Optionally, the determination information includes information of a mapped position, in an entire transmission bandwidth, of a preset position in the data channel transmission bandwidth position.

Optionally, the data channel transmission bandwidth indication information is further used for indicating the data channel transmission bandwidth position.

Optionally, the method further includes: determining, according to the data channel transmission bandwidth indication information, a resource granularity used for frequency domain resource allocation.

Optionally, the method further includes: transmitting data to the terminal according to the data channel transmission bandwidth indication information, the first correspondence and the second correspondence.

Optionally, the data channel transmission bandwidth is a total bandwidth occupied by multiple data channels simultaneously transmitted in one slot.

An embodiment of the present disclosure further provides a data channel transmission bandwidth determination method, performed by a terminal, including:
receiving scheduling information, transmitted by a network side device, for scheduling data channel transmission; where the scheduling information includes data channel transmission bandwidth indication information;
determining data channel transmission bandwidth information according to the data channel transmission bandwidth indication information.

Optionally, there is a first correspondence between the data channel transmission bandwidth indication information and a data channel transmission bandwidth size, and there is a second correspondence between the data channel transmission bandwidth size and a data channel transmission bandwidth position.

Optionally, before the receiving the scheduling information, transmitted by the network side device, for scheduling the data channel transmission, the method further includes: agreeing on the first correspondence and the second correspondence with the network side device.

Optionally, the determining data channel transmission bandwidth information according to the data channel transmission bandwidth indication information includes: determining the data channel transmission bandwidth information according to the data channel transmission bandwidth indication information, the first correspondence and the second correspondence.

Optionally, the data channel transmission bandwidth indication information includes N bits, where N is a positive integer greater than 1; the data channel transmission bandwidth indication information is to indicate $2^N$ types of different status information, where each type of status information corresponds to one data channel transmission bandwidth size, or each type of status information corresponds to one data channel transmission bandwidth size and one data channel transmission bandwidth position.

Optionally, an indication field of the data channel transmission bandwidth indication information is located before a frequency domain resource indication field.

Optionally, the data channel transmission bandwidth indication information is used for indicating the data channel transmission bandwidth size.

Optionally, the determining data channel transmission bandwidth information according to the data channel transmission bandwidth indication information includes: determining the data channel transmission bandwidth information according to the data channel transmission bandwidth indication information and the first correspondence.

Optionally, the method further includes:
receiving frequency domain resource allocation information transmitted by the network side device; where the frequency domain resource allocation information includes an index of a resource block in a frequency domain resource allocated to the data channel;
determining the data channel transmission bandwidth position according to determined data channel transmission bandwidth size, the index of the resource block and the second correspondence.

Optionally, the determining the data channel transmission bandwidth position according to the determined data channel transmission bandwidth size, the index of the resource block and the second correspondence includes: in a case that the index of the resource block occupies at least two data channel transmission bandwidth positions in the second correspondence, adjusting the determined data channel transmission bandwidth size according to the data channel transmission bandwidth positions occupied by the index of the resource block, and determining a data channel transmission bandwidth position corresponding to the adjusted data channel transmission bandwidth size.

Optionally, after determining the data channel transmission bandwidth information according to the data channel transmission bandwidth indication information and the first correspondence, the method further includes:
determining the data channel transmission bandwidth position according to the determined data channel transmission bandwidth size and the second correspondence;
where the second correspondence includes determination information of the data channel transmission bandwidth position corresponding to the data channel transmission bandwidth size.

Optionally, the determination information includes information of a mapped position, in an entire transmission bandwidth, of a preset position in the data channel transmission bandwidth position.

Optionally, the data channel transmission bandwidth indication information is further used for indicating the data channel transmission bandwidth position.

Optionally, the determining data channel transmission bandwidth information according to the data channel transmission bandwidth indication information includes: determining the data channel transmission bandwidth size and the data channel transmission bandwidth position according to the data channel transmission bandwidth indication information, the first correspondence and the second correspondence.

Optionally, the method further includes: determining, according to the data channel transmission bandwidth indication information, a resource granularity used for frequency domain resource allocation.

Optionally, after the receiving the scheduling information, transmitted by the network side device, for scheduling the data channel transmission, the method further includes: receiving data transmitted by the network side device according to the determined data channel transmission bandwidth size and the determined data channel transmission bandwidth position.

An embodiment of the present disclosure further provides a network side device, including: a memory, a processor, a transceiver and a program stored in the memory and executable by the processor, where the processor is configured to execute the program to implement following steps:
transmitting, to a terminal through the transceiver, scheduling information for scheduling data channel transmission;
where the scheduling information includes data channel transmission bandwidth indication information.

Optionally, there is a first correspondence between the data channel transmission bandwidth indication information and a data channel transmission bandwidth size, and there is a second correspondence between the data channel transmission bandwidth size and a data channel transmission bandwidth position.

Optionally, the processor is further configured to: before transmitting scheduling information for scheduling data channel transmission to the terminal, agree on the first correspondence and the second correspondence with the terminal.

Optionally, the processor is specifically configured to: transmit, to the terminal, the scheduling information for scheduling data channel transmission according to the first correspondence and the second correspondence.

Optionally, the data channel transmission bandwidth indication information includes N bits, where N is a positive integer greater than 1; the data channel transmission bandwidth indication information is to indicate $2^N$ types of different status information, where each type of status information corresponds to one data channel transmission bandwidth size, or each type of status information corresponds to one data channel transmission bandwidth size and one data channel transmission bandwidth position.

Optionally, an indication field of the data channel transmission bandwidth indication information is located before a frequency domain resource indication field.

Optionally, the data channel transmission bandwidth indication information is used for indicating the data channel transmission bandwidth size.

Optionally, the processor is further configured to:
transmit frequency domain resource allocation information to the terminal through the transceiver;
where the frequency domain resource allocation information includes an index of a resource block in a frequency domain resource allocated to the data channel.

Optionally, the processor is further configured to: in a case that the index of the resource block occupies at least two data channel transmission bandwidth positions in the second correspondence, adjust the data channel transmission bandwidth size according to the data channel transmission bandwidth positions occupied by the index of the resource block, and determine a data channel transmission bandwidth position corresponding to the adjusted data channel transmission bandwidth size.

Optionally, the second correspondence includes determination information of the data channel transmission bandwidth position corresponding to the data channel transmission bandwidth size.

Optionally, the determination information includes information of a mapped position, in an entire transmission bandwidth, of a preset position in the data channel transmission bandwidth position.

Optionally, the data channel transmission bandwidth indication information is further used for indicating the data channel transmission bandwidth position.

Optionally, the processor is further configured to: determine a resource granularity used for frequency domain resource allocation according to the data channel transmission bandwidth indication information.

Optionally, the processor is further configured to: transmit data to the terminal through the transceiver according to the data channel transmission bandwidth indication information, the first correspondence and the second correspondence.

Optionally, the data channel transmission bandwidth is a total bandwidth occupied by multiple data channels simultaneously transmitted in one slot.

An embodiment of the present disclosure further provides a terminal, including: a memory, a processor, a transceiver and a program stored in the memory and executable by the processor, where the processor is configured to execute the program to implement following steps:
receiving scheduling information, transmitted by a network side device, for scheduling data channel transmission through the transceiver; where the scheduling information includes data channel transmission bandwidth indication information;
determining data channel transmission bandwidth information according to the data channel transmission bandwidth indication information.

Optionally, there is a first correspondence between the data channel transmission bandwidth indication information and a data channel transmission bandwidth size, and there is a second correspondence between the data channel transmission bandwidth size and a data channel transmission bandwidth position.

Optionally, the processor is further configured to: before receiving scheduling information, transmitted by the network side device, for scheduling data channel transmission, agree on the first correspondence and the second correspondence with the network side device.

Optionally, the processor is specifically configured to: determine the data channel transmission bandwidth information according to the data channel transmission bandwidth indication information, the first correspondence and the second correspondence.

Optionally, the data channel transmission bandwidth indication information includes N bits, where N is a positive integer greater than 1; the data channel transmission bandwidth indication information is to indicate $2^N$ types of different status information, where each type of status information corresponds to one data channel transmission bandwidth size, or each type of status information corresponds to one data channel transmission bandwidth size and one data channel transmission bandwidth position.

Optionally, an indication field of the data channel transmission bandwidth indication information is located before a frequency domain resource indication field.

Optionally, the data channel transmission bandwidth indication information is used for indicating the data channel transmission bandwidth size.

Optionally, the processor is specifically configured to: determine the data channel transmission bandwidth size according to the data channel transmission bandwidth indication information and the first correspondence.

Optionally, the processor is further configured to:
receive, through the transceiver, frequency domain resource allocation information transmitted by the network side device; where the frequency domain resource allocation information includes an index of a resource block in a frequency domain resource allocated to the data channel;
determine the data channel transmission bandwidth position according to determined data channel transmission bandwidth size, the index of the resource block and the second correspondence.

Optionally, the processor is specifically configured to: in a case that the index of the resource block occupies at least two data channel transmission bandwidth positions in the second correspondence, adjust determined data channel transmission bandwidth size according to the data channel transmission bandwidth positions occupied by the index of the resource block, and determine a data channel transmission bandwidth position corresponding to the adjusted data channel transmission bandwidth size.

Optionally, the processor is further configured to:

after determining the data channel transmission bandwidth size according to the data channel transmission bandwidth indication information and the first correspondence, determine the data channel transmission bandwidth position according to determined data channel transmission bandwidth size and the second correspondence;

where the second correspondence includes determination information of the data channel transmission bandwidth position corresponding to the data channel transmission bandwidth size.

Optionally, the determination information includes information of a mapped position, in an entire transmission bandwidth, of a preset position in the data channel transmission bandwidth position.

Optionally, the data channel transmission bandwidth indication information is further used for indicating the data channel transmission bandwidth position.

Optionally, the processor is specifically configured to: determine the data channel transmission bandwidth size and the data channel transmission bandwidth position according to the data channel transmission bandwidth indication information, the first correspondence and the second correspondence.

Optionally, the processor is further configured to: determine a resource granularity used for frequency domain resource allocation according to the data channel transmission bandwidth indication information.

Optionally, the processor is further configured to: after receiving scheduling information transmitted by the network side device for scheduling data channel transmission, receive, through the transceiver, data transmitted by the network side device according to the determined data channel transmission bandwidth size and the determined data channel transmission bandwidth position.

An embodiment of the present disclosure further provides a computer readable storage medium storing a program thereon, where the program is configured to be executed by a processor to implement steps of the above data channel transmission bandwidth determination method of the network device side; or the program is configured to be executed by a processor to implement steps of the above data channel transmission bandwidth determination method of the terminal side.

An embodiments of the present disclosure further provide a data channel transmission bandwidth determination apparatus, applied to a network side device, including:

a first transmitting module, configured to transmit, to a terminal, scheduling information for scheduling data channel transmission;

where the scheduling information includes data channel transmission bandwidth indication information.

Optionally, there is a first correspondence between the data channel transmission bandwidth indication information and a data channel transmission bandwidth size, and there is a second correspondence between the data channel transmission bandwidth size and a data channel transmission bandwidth position.

Optionally, the network side device further includes: a first agreeing module, configured to, before transmitting, to the terminal, the scheduling information for scheduling the data channel transmission, agree on the first correspondence and the second correspondence with the terminal.

Optionally, the first transmitting module includes: a first transmitting submodule, configured to transmit, to the terminal, the scheduling information for scheduling the data channel transmission according to the first correspondence and the second correspondence.

Optionally, the data channel transmission bandwidth indication information includes N bits, where N is a positive integer greater than 1; the data channel transmission bandwidth indication information is to indicate $2^N$ types of different status information, where each type of status information corresponds to one data channel transmission bandwidth size, or each type of status information corresponds to one data channel transmission bandwidth size and one data channel transmission bandwidth position.

Optionally, an indication field of the data channel transmission bandwidth indication information is located before a frequency domain resource indication field.

Optionally, the data channel transmission bandwidth indication information is used for indicating the data channel transmission bandwidth size.

Optionally, the network side device further includes:

a second transmitting module, configured to transmit frequency domain resource allocation information to the terminal;

where the frequency domain resource allocation information includes an index of a resource block in a frequency domain resource allocated to a data channel.

Optionally, the network side device further includes: a first processing module, configured to, in a case that the index of the resource block occupies at least two data channel transmission bandwidth positions in the second correspondence, adjust the data channel transmission bandwidth size according to the data channel transmission bandwidth positions occupied by the index of the resource block, and determine a data channel transmission bandwidth position corresponding to the adjusted data channel transmission bandwidth size.

Optionally, the second correspondence includes determination information of the data channel transmission bandwidth position corresponding to the data channel transmission bandwidth size.

Optionally, the determination information includes information of a mapped position, in an entire transmission bandwidth, of a preset position in the data channel transmission bandwidth position.

Optionally, the data channel transmission bandwidth indication information is further used for indicating the data channel transmission bandwidth position.

Optionally, the network side device further includes: a first determining module, configured to determine, according to the data channel transmission bandwidth indication information, a resource granularity used for frequency domain resource allocation.

Optionally, the network side device further includes: a third transmitting module, configured to transmit data to the terminal according to the data channel transmission bandwidth indication information, the first correspondence and the second correspondence.

Optionally, the data channel transmission bandwidth is a total bandwidth occupied by multiple data channels simultaneously transmitted in one slot.

An embodiment of the present disclosure further provides a data channel transmission bandwidth determination apparatus, applied to a terminal, including:

a first receiving module, configured to receive scheduling information, transmitted by a network side device, for scheduling data channel transmission; where the scheduling information includes data channel transmission bandwidth indication information;

a second determining module, configured to determine data channel transmission bandwidth information according to the data channel transmission bandwidth indication information.

Optionally, there is a first correspondence between the data channel transmission bandwidth indication information and a data channel transmission bandwidth size, and there is a second correspondence between the data channel transmission bandwidth size and a data channel transmission bandwidth position.

Optionally, the terminal further includes: a second agreeing module, configured to, before receiving scheduling information, transmitted by the network side device, for scheduling data channel transmission, agree on the first correspondence and the second correspondence with the network side device.

Optionally, the second determining module includes: a first determining submodule, configured to determine the data channel transmission bandwidth information according to the data channel transmission bandwidth indication information, the first correspondence and the second correspondence.

Optionally, the data channel transmission bandwidth indication information includes N bits, where N is a positive integer greater than 1; the data channel transmission bandwidth indication information is to indicate $2^N$ types of different status information, where each type of status information corresponds to one data channel transmission bandwidth size, or each type of status information corresponds to one data channel transmission bandwidth size and one data channel transmission bandwidth position.

Optionally, an indication field of the data channel transmission bandwidth indication information is located before a frequency domain resource indication field.

Optionally, the data channel transmission bandwidth indication information is used for indicating the data channel transmission bandwidth size.

Optionally, the second determining module includes: a second determining submodule, configured to determine the data channel transmission bandwidth size according to the data channel transmission bandwidth indication information and the first correspondence.

Optionally, the terminal further includes:

a second receiving module, configured to receive frequency domain resource allocation information transmitted by the network side device; where the frequency domain resource allocation information includes an index of a resource block in a frequency domain resource allocated to the data channel;

a third determining module, configured to determine the data channel transmission bandwidth position according to the data channel transmission bandwidth size, the index of the resource block and the second correspondence.

Optionally, the third determining module includes: a first processing submodule, configured to, in a case that the index of the resource block occupies at least two data channel transmission bandwidth positions in the second correspondence, adjust determined data channel transmission bandwidth size according to the data channel transmission bandwidth positions occupied by the index of the resource block, and determine a data channel transmission bandwidth position corresponding to the adjusted data channel transmission bandwidth size.

Optionally, the terminal further includes:

a fourth determining module, configured to, after determining the data channel transmission bandwidth size according to the data channel transmission bandwidth indication information and the first correspondence, determine the data channel transmission bandwidth position according to the determined data channel transmission bandwidth size and the second correspondence;

where the second correspondence includes determination information of the data channel transmission bandwidth position corresponding to the data channel transmission bandwidth size.

Optionally, the determination information includes information of a mapped position, in an entire transmission bandwidth, of a preset position in the data channel transmission bandwidth position.

Optionally, the data channel transmission bandwidth indication information is further used for indicating the data channel transmission bandwidth position.

Optionally, the second determining module includes: a third determining submodule, configured to determine the data channel transmission bandwidth size and the data channel transmission bandwidth position according to the data channel transmission bandwidth indication information, the first correspondence and the second correspondence.

Optionally, the terminal further includes: a fifth determining module, configured to determine a resource granularity used for frequency domain resource allocation according to the data channel transmission bandwidth indication information.

Optionally, the terminal further includes: a third receiving module, configured to, after receiving the scheduling information, transmitted by the network side device, for scheduling the data channel transmission, receive data transmitted by the network side device according to the determined data channel transmission bandwidth size and the determined data channel transmission bandwidth position.

The beneficial effects of the above technical solutions of the present disclosure are as follows.

In the above solutions, in the data channel transmission bandwidth determination method, scheduling information for scheduling data channel transmission is transmitted to a terminal, where the scheduling information includes data channel transmission bandwidth indication information, so that the terminal may determine the data channel transmission bandwidth information according to the data channel transmission bandwidth indication information, thereby ensuring that the terminal smoothly completes a data processing process and ensuring system performance; and the problem in the related art that the terminal side cannot know the data channel transmission bandwidth when multiple downlink data channels coexist and frequency domain resources of the multiple downlink data channels are continuous or discontinuous may be solved.

DETAILED DESCRIPTION

In order to make the technical problem, technical solutions, and advantages of the present disclosure clearer, a detailed description will be made as below in conjunction with the accompanying drawings and specific embodiments.

Figure 1:
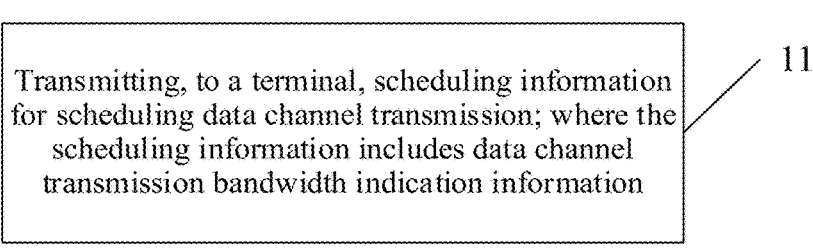
FIG. 1 is a first schematic flowchart of a data channel transmission bandwidth determination method according to an embodiment of the present disclosure.

Aiming at the problem in the related art that the terminal side cannot know the data channel transmission bandwidth when multiple downlink data channels coexist and frequency domain resources of the multiple downlink data channels are continuous or discontinuous, the present disclosure provides a data channel transmission bandwidth determination method performed by a network side device. As shown in FIG. 1, the method includes:

step 11: transmitting, to a terminal, scheduling information for scheduling data channel transmission;

where the scheduling information includes data channel transmission bandwidth indication information.

The scheduling information may be downlink scheduling information or uplink scheduling information, which is not limited here.

In the data channel transmission bandwidth determination method provided by the embodiment of the present disclosure, scheduling information for scheduling data channel transmission is transmitted to a terminal, where the scheduling information includes data channel transmission bandwidth indication information, so that the terminal may determine the data channel transmission bandwidth information (size, or, size and position) according to the data channel transmission bandwidth indication information, thereby ensuring that the terminal smoothly completes a data processing process and ensuring system performance; and the problem in the related art that the terminal side cannot know the data channel transmission bandwidth when multiple downlink data channels coexist and frequency domain resources of the multiple downlink data channels are continuous or discontinuous may be solved.

Specifically, there is a first correspondence between the data channel transmission bandwidth indication information and a data channel transmission bandwidth size, and there is a second correspondence between the data channel transmission bandwidth size and a data channel transmission bandwidth position.

Further, before transmitting, to the terminal, scheduling information for scheduling data channel transmission, the method further includes: agreeing on the first correspondence and the second correspondence with the terminal.

Correspondingly, the transmitting, to the terminal, the scheduling information for scheduling the data channel transmission includes: transmitting, to the terminal, the scheduling information for scheduling the data channel transmission according to the first correspondence and the second correspondence.

The data channel transmission bandwidth indication information includes N bits, where N is a positive integer greater than 1; the data channel transmission bandwidth indication information is to indicate $2^N$ types of different status information, where each type of status information corresponds to one data channel transmission bandwidth size, or each type of status information corresponds to one data channel transmission bandwidth size and one data channel transmission bandwidth position.

Specifically, an indication field of the data channel transmission bandwidth indication information is located before a frequency domain resource indication field.

The data channel transmission bandwidth indication information in the embodiment of the present disclosure is used for indicating the data channel transmission bandwidth information. Specifically, the data channel transmission bandwidth information may be the data channel transmission bandwidth size (case I), or the data channel transmission bandwidth size and position (case II);

for the case I, in the embodiment of the present disclosure, another message can be used for informing the terminal of the data channel transmission bandwidth position (measure I), or the data channel transmission bandwidth position can be determined in a manner predefined by the network side device and the terminal (e.g., a rule for determining the data channel transmission bandwidth position is agreed on in advance) (measure II):

for the case I, the data channel transmission bandwidth indication information is used for indicating the data channel transmission bandwidth size.

Regarding the measure I, the data channel transmission bandwidth determination method further includes: transmitting frequency domain resource allocation information to the terminal; where the frequency domain resource allocation information includes an index of a resource block in a frequency domain resource allocated to a data channel.

Further, the data channel transmission bandwidth determination method further includes: if the index of the resource block occupies at least two data channel transmission bandwidth positions in the second correspondence, adjusting the data channel transmission bandwidth size according to the data channel transmission bandwidth positions occupied by the index of the resource block, and determining a data channel transmission bandwidth position corresponding to the adjusted data channel transmission bandwidth size.

For example: if the data channel transmission bandwidth size indicated by the data channel transmission bandwidth indication information is ¼ bandwidth, and the allocated resource block indexes (RB indexes) span across RB indexes of ¼ bandwidth and ¾ bandwidth, that is, the RB indexes occupy positions of ¼ bandwidth and ¾ bandwidth, the data channel transmission bandwidth size can be adjusted to ½ bandwidth, and a data channel transmission bandwidth position corresponding to the ½ bandwidth can be determined.

Regarding the measure II, the second correspondence includes determination information of the data channel transmission bandwidth position corresponding to the data channel transmission bandwidth size.

Specifically, the determination information includes information of a mapped position, in an entire transmission bandwidth, of a preset position in the data channel transmission bandwidth position.

The preset position can be a start position, an end position, or a middle position of the data channel transmission bandwidth; determination information of the preset position can be information indicating that the start position of the data channel transmission bandwidth position is mapped to the start position, middle position or the like of the entire bandwidth, but the present disclosure is not limited thereto.

For the case II, the data channel transmission bandwidth indication information is further used for indicating the data channel transmission bandwidth position.

Further, the data channel transmission bandwidth determination method further includes: determining, according to the data channel transmission bandwidth indication information, a resource granularity used for frequency domain resource allocation.

In this way, correct transmission of data may be ensured.

Further, the data channel transmission bandwidth determination method further includes: transmitting data to the terminal according to the data channel transmission bandwidth indication information, the first correspondence and the second correspondence.

In this way, data transmission may be completed correctly.

In the embodiment of the present disclosure, the data channel transmission bandwidth is a total bandwidth occupied by multiple data channels simultaneously transmitted in one slot (a total bandwidth in which the multiple data channels are transmitted).

Figure 2:
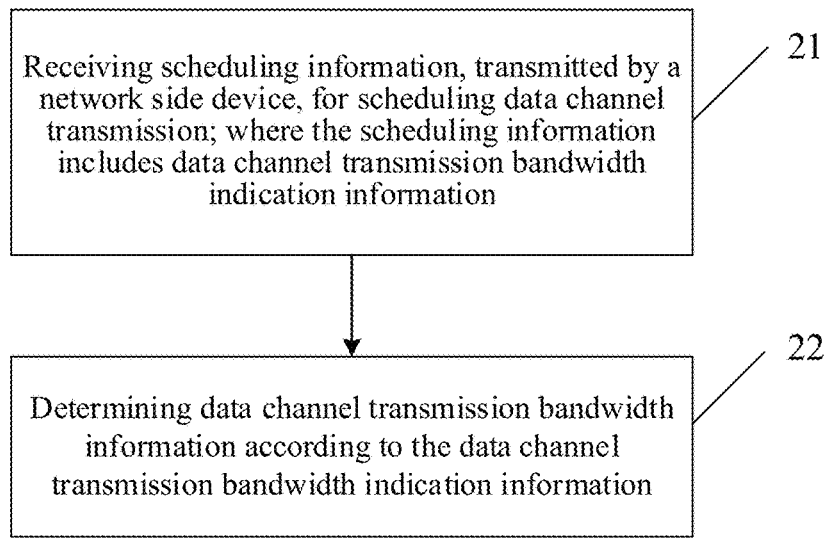
FIG. 2 is a second schematic flowchart of a data channel transmission bandwidth determination method according to an embodiment of the present disclosure.

An embodiment of the present disclosure further provides a data channel transmission bandwidth determination method performed by a terminal. As shown in FIG. 2, the method includes:

step 21: receiving scheduling information, transmitted by a network side device, for scheduling data channel transmission; where the scheduling information includes data channel transmission bandwidth indication information;

step 22: determining data channel transmission bandwidth information according to the data channel transmission bandwidth indication information.

The scheduling information may be downlink scheduling information or uplink scheduling information, which is not limited here. The data channel transmission bandwidth information includes the data channel transmission bandwidth size, or the data channel transmission bandwidth size and the data channel transmission bandwidth position, but the present disclosure is not limited thereto.

In the data channel transmission bandwidth determination method provided by the embodiment of the present disclosure, scheduling information, transmitted by a network side device, for scheduling data channel transmission is received; where the scheduling information includes data channel transmission bandwidth indication information. The data channel transmission bandwidth information is determined according to the data channel transmission bandwidth indication information, thus it can be ensured that the data channel transmission bandwidth may be known when multiple downlink data channels coexist and frequency domain resources of the multiple downlink data channels are continuous or discontinuous, thereby ensuring that a data processing process may be smoothly completed and ensuring system performance; and the problem in the related art that the terminal side cannot know the data channel transmission bandwidth when multiple downlink data channels coexist and frequency domain resources of the multiple downlink data channels are continuous or discontinuous may be solved.

Specifically, there is a first correspondence between the data channel transmission bandwidth indication information and a data channel transmission bandwidth size, and there is a second correspondence between the data channel transmission bandwidth size and a data channel transmission bandwidth position.

Further, before receiving scheduling information, transmitted by the network side device, for scheduling data channel transmission, the method further includes: agreeing on the first correspondence and the second correspondence with the network side device.

Correspondingly, the determining data channel transmission bandwidth information according to the data channel transmission bandwidth indication information includes: determining the data channel transmission bandwidth information according to the data channel transmission bandwidth indication information, the first correspondence and the second correspondence.

The data channel transmission bandwidth indication information includes N bits, where N is a positive integer greater than 1; the data channel transmission bandwidth indication information may indicate $2^N$ types of different status information, where each type of status information corresponds to one data channel transmission bandwidth size, or each type of status information corresponds to one data channel transmission bandwidth size and one data channel transmission bandwidth position.

Specifically, an indication field of the data channel transmission bandwidth indication information is located before a frequency domain resource indication field.

The data channel transmission bandwidth indication information in the embodiment of the present disclosure is used for indicating the data channel transmission bandwidth information. Specifically, the data channel transmission bandwidth information may be the data channel transmission bandwidth size (case I) or the data channel transmission bandwidth size and position (case II);

for the case I, in the embodiment of the present disclosure, the data channel transmission bandwidth position can be known by means of another message (measure I), or the data channel transmission bandwidth position can be determined in a manner predefined by the terminal and the network side device (e.g., a rule for determining the data channel transmission bandwidth position is agreed on in advance) (measure II):

for the case I, the data channel transmission bandwidth indication information is used for indicating the data channel transmission bandwidth size.

Regarding the measure I, the determining data channel transmission bandwidth information according to the data channel transmission bandwidth indication information includes: determining the data channel transmission bandwidth size according to the data channel transmission bandwidth indication information and the first correspondence.

Further, the data channel transmission bandwidth determination method further includes: receiving frequency domain resource allocation information transmitted by the network side device; where the frequency domain resource allocation information includes an index of a resource block in a frequency domain resource allocated to the data channel; determining the data channel transmission bandwidth position according to the determined data channel transmission bandwidth size, the index of the resource block and the second correspondence.

Specifically, the determining the data channel transmission bandwidth position according to the determined data channel transmission bandwidth size, the index of the resource block and the second correspondence includes: if the index of the resource block occupies at least two data channel transmission bandwidth positions in the second correspondence, adjusting the determined data channel transmission bandwidth size according to the data channel transmission bandwidth positions occupied by the index of the resource block, and determining a data channel transmission bandwidth position corresponding to the adjusted data channel transmission bandwidth size.

For example: if the data channel transmission bandwidth size determined according to the data channel transmission bandwidth indication information and the first correspondence is ¼ bandwidth, and the allocated resource block indexes (RB indexes) span across RB indexes of ¼ bandwidth and ⅔ bandwidth, that is, the RB indexes occupy positions of ¼ bandwidth and ⅔ bandwidth, the data channel transmission bandwidth size can be adjusted to ½ bandwidth, and a data channel transmission bandwidth position corresponding to the ½ bandwidth can be determined.

Regarding the measure II, after determining the data channel transmission bandwidth size according to the data channel transmission bandwidth indication information and the first correspondence, the method further includes: determining the data channel transmission bandwidth position according to the determined data channel transmission bandwidth size and the second correspondence; the second correspondence includes determination information of the data channel transmission bandwidth position corresponding to the data channel transmission bandwidth size.

Specifically, the determination information includes information of a mapped position, in an entire transmission bandwidth, of a preset position in the data channel transmission bandwidth position.

The preset position can be a start position, an end position, or a middle position of the data channel transmission bandwidth; determination information of the preset position can be information indicating that the start position of the data channel transmission bandwidth position is mapped to the start position, middle position or the like of the entire bandwidth, but the present disclosure is not limited thereto.

For the case II, the data channel transmission bandwidth indication information is further used for indicating the data channel transmission bandwidth position.

Specifically, the determining data channel transmission bandwidth information according to the data channel transmission bandwidth indication information includes: determining the data channel transmission bandwidth size and the data channel transmission bandwidth position according to the data channel transmission bandwidth indication information, the first correspondence and the second correspondence.

In this case, the second correspondence is a correspondence between a data channel transmission bandwidth size and a specific data channel transmission bandwidth position.

Further, the data channel transmission bandwidth determination method further includes: determining, according to the data channel transmission bandwidth indication information, a resource granularity used for frequency domain resource allocation.

In this way, correct transmission of data may be ensured.

The data channel transmission bandwidth determination method further includes: after receiving the scheduling information, transmitted by the network side device, for scheduling data channel transmission, receiving data transmitted by the network side device according to the determined data channel transmission bandwidth size and data channel transmission bandwidth position.

In this way, data transmission may be completed correctly.

In the embodiment of the present disclosure, the data channel transmission bandwidth is a total bandwidth occupied by multiple data channels simultaneously transmitted by the network side device in one slot (a total bandwidth in which the multiple data channels are transmitted).

The data channel transmission bandwidth determination method provided by the embodiments of the present disclosure will be further described below with respect to both the network side device and the terminal. A base station is taken as an example of the network side device, and downlink control information DCI is taken as an example the scheduling information.

In view of the above technical problem, the embodiments of the present disclosure provide a data channel transmission bandwidth determination method, which mainly involves: carrying data channel transmission bandwidth indication information in DCI; predefining a correspondence between the data channel transmission bandwidth indication information in the DCI and a data channel transmission bandwidth (including a correspondence between the data channel transmission bandwidth indication information and a data channel transmission bandwidth size, or a correspondence between the data channel transmission bandwidth indication information and the data channel transmission bandwidth size and position); determining a frequency domain resource allocation granularity according to the data channel transmission bandwidth indication information carried in the DCI.

Specifically, on the base station side:
1. The base station carries the data channel transmission bandwidth indication information in the DCI scheduling the data channel transmission.

Specifically, the data channel transmission bandwidth indication information may include N bits (a value of N may be determined according to information to be transmitted), and N is a positive integer greater than 1.

The N bits may indicate $2^N$ types of different status information, and each type of status information corresponds to one data channel transmission bandwidth size, or each type of status information corresponds to one data channel transmission bandwidth size and one data channel transmission bandwidth position.

Optionally, an indication field of the data channel transmission bandwidth indication information is located before a frequency domain resource indication field.

2. Division of data channel transmission bandwidth can be determined in a predefined manner.

Method 1: predefining a data channel transmission bandwidth range (that is, the data channel transmission bandwidth size, such as full bandwidth, ½ bandwidth, and ¼ bandwidth), and determining resource block (RB) indexes of RBs contained in each bandwidth range in the case of different respective data channel transmission bandwidth ranges (that is, predefining a correspondence between the data channel bandwidth range and the RB range, that is, a correspondence between the data channel transmission bandwidth size and the data channel transmission bandwidth position); the following table 1 shows the bandwidth division when the supported data channel transmission bandwidth size is full bandwidth, ½ bandwidth and ¼ bandwidth (the correspondence between the data channel transmission bandwidth indication information and the data channel transmission bandwidth size and position, but the present disclosure is not limited thereto), assuming that the quantity of RBs included in the entire transmission bandwidth is M (which can be determined according to the system bandwidth), a process for the terminal to determine the data channel transmission bandwidth size and an exact position thereof can be: the terminal determines the data channel transmission bandwidth size, that is, full bandwidth or ½ bandwidth or ¼ bandwidth, according to the data channel bandwidth indication information; the terminal determines, according to the frequency domain resource allocation indication information, a RB range of the data channel transmission bandwidth in which the RB indexes (i.e., resource block indexes, specifically based on a lowest or highest RB index) of the RBs allocated to the terminal are located, so as to determine an exact frequency domain position of the data channel transmission bandwidth.

In the case that the RB indexes span across subbands (RB ranges), a mapping operation can be performed according to the correspondence between a bandwidth size and a bandwidth position. For example, if the RB indexes of the allocated RBs span across the RB indexes of ¼ bandwidth and ²⁄₄ bandwidth, then the RB indexes of the allocated RBs can be mapped to ½ bandwidth; for example, if the RB indexes of the allocated RBs span across the RB indexes of ¼ bandwidth to ¾ bandwidth, then the RB indexes of the allocated RBs can be mapped to full bandwidth; for another example, if the RB indexes of the allocated RBs span across the RB indexes of ²⁄₄ bandwidth to ¾ bandwidth, then the RB indexes of the allocated RBs can be mapped to full bandwidth.

TABLE 1

| Data channel bandwidth indication (11 is reserved) | 00 Full bandwidth | 01 ½ bandwidth | 10 ¼₊₁₂ bandwidth |
|---|---|---|---|
| RB range of data channel transmission bandwidth | 0~M − 1 | BW (subband)#0: 0~[M/2](Round up), or 0~[M/2] (Round down) BW#1: [M/2] + 1~M or [M/2] + 1~M | BW#0: 0~[M/4] or 0~[M/4] BW#1: [M/4] + 1~[M/2] or [M/4] + 1~[M/2] BW#2: [M/2] + 1~3 × [M/4] or [M/2] + 1~3 × [M/4] BW#3: 3 × [M/4] + 1~M − 1 or 3 × [M/4] + 1~M − 1 |

Method 2: both the data channel transmission bandwidth size and a specific position of the data channel transmission bandwidth in the transmission bandwidth are indicated by the data channel transmission bandwidth indication information in the DCI. The length of an indication field of the data channel transmission bandwidth indication information may be N bits, where N is a positive integer greater than 1.

Assuming that there are three data transmission bandwidth sizes, namely, full bandwidth, ½ bandwidth and ¼ bandwidth, and N=2 bits; the correspondence between the data channel transmission bandwidth indication information and the data channel transmission bandwidth size and position can be as shown in following Table 2 (In the table, M is the quantity of RBs included in the entire transmission bandwidth), but the present disclosure is not limited thereto:

TABLE 2

| Data channel transmission bandwidth | Data channel transmission bandwidth position |
|---|---|
| 00 Full bandwidth | 0~M − 1 |
| 01 ½ bandwidth | 0~[M/2] or 0~[M/2] |

TABLE 2-continued

| Data channel transmission bandwidth | Data channel transmission bandwidth position |
|---|---|
| 10 ¼ bandwidth | 0~[M/4] or 0~[M/4] |
| 11 Reserved | Reserved |

Assuming that there are three data transmission bandwidth sizes, namely, full bandwidth, ½ bandwidth and ¼ bandwidth, and N=3 bits; the correspondence between the data channel transmission bandwidth indication information and the data channel transmission bandwidth size and position can be as shown in following Table 3 (In the table, M is the quantity of RBs included in the entire transmission bandwidth), but the present disclosure is not limited thereto:

TABLE 3

| Data channel transmission bandwidth | Data channel transmission bandwidth position |
|---|---|
| 000 Full bandwidth | 0~M − 1 |
| 001 ½ bandwidth | 0~[M/2] or 0~[M/2] |
| 010 ½ bandwidth | [M/2] + 1~M − 1or [M/2] + 1~M − 1 |
| 011 ¼ bandwidth | 0~[M/4] or 0~[M/4] |
| 100 ¼ bandwidth | [M/4] + 1~[M/2] or [M/4] + 1~[M/2] |

TABLE 3-continued

| Data channel transmission bandwidth | Data channel transmission bandwidth position |
|---|---|
| 101 ¼ bandwidth | [M/2] + 1~3 × [M/4] or [M/2] + 1~3 × [M/4] |
| 110 ¼ bandwidth | 3 × [M/4] + 1~M − 1 or 3 × [M/4] + 1~M − 1 |
| 111 Reserved | Reserved |

Method 3: The data channel transmission bandwidth indication information indicates the data channel transmission bandwidth size, and the length of the indication field of the data channel transmission bandwidth indication information may be N bits, where N is a positive integer greater than 1. Specific frequency domain positions of data transmission channel bandwidths of different sizes can be determined in a predefined manner (for example, the subband position is fixed). The predefined manner may define the correspondence between the data channel transmission bandwidth size and the data channel transmission bandwidth position as: all of the data channel transmission bandwidth positions start from a lowest RB index, and full bandwidth corresponds to a range of 0~M−1, ½ bandwidth corresponds to a range of 0~⌈M/2⌉ or 0~⌊M/2⌋ and ¼ bandwidth corresponds to a range of 0~⌈M/4⌉ or 0~⌊M/4⌋; the correspondence can also be: all of the data channel transmission bandwidth positions start from a highest RB index, and full bandwidth corresponds to a range of 0~M−1, ½ bandwidth corresponds to a range of ⌈M/2⌉+1~M or ⌊M/2⌋+1~M or ⌊M/2⌋+1~M and ¼ bandwidth corresponds to a range of 3×⌈M/4⌉+1~M−1 or 3×⌊M/4⌋+1~M−1. M is the quantity of RBs included in the entire transmission bandwidth.

3. Further, the frequency domain resource allocation granularity can be adjusted according to the data channel transmission bandwidth indication information in the DCI;

For example, taking the above assumption as an example, when the data channel transmission bandwidth size is ¼ bandwidth, the resource allocation granularity can be 1 RB; when the data channel transmission bandwidth size is ½ bandwidth, the resource allocation granularity can be 2 RBs; when the data channel transmission bandwidth size is full bandwidth, the resource allocation granularity can be 4 RBs, but the present disclosure is not limited thereto.

On the terminal side:
1. The terminal receives the DCI and obtains the data channel bandwidth indication information in the DCI;
2. The terminal determines the data channel transmission bandwidth size and specific position of the data channel transmission bandwidth on the basis of the data channel bandwidth indication information in the DCI according to the predefined rule; specifically, the terminal performs the determination process according to a predefined manner corresponding to the base station, a reference may be made to the above description related to the predefined manner on the base station side and the description will not be repeated here.
3. Further, the terminal obtains the frequency domain resource allocation granularity according to the data channel transmission bandwidth indication information (corresponding to the base station side, the frequency domain resource allocation granularity can be adjusted according to the data channel transmission bandwidth indicated in the DCI).

The solutions provided in the embodiments of the present disclosure are illustrated below with examples.

Example 1 (corresponding to the above method 1): assuming that the system bandwidth is 400 MHz and the subcarrier spacing is 120 kHz, the system bandwidth contains 250 RBs. Assume that possible data transmission bandwidths are full bandwidth, ½ bandwidth and ¼ bandwidth. Assume that the network side schedules multiple PDSCHs simultaneously in one slot.

The network side carries the data channel transmission bandwidth indication information in the transmitted DCI for scheduling PDSCH. In this example, since there are three possible data channel transmission bandwidths, an indication field size needs to be N=ceil(log 2(3))=2 bits (ceil means rounding). It should be noted that the indication field needs to be placed before the frequency domain resource allocation indication field. Different statuses of the 2 bits information indicate different respective data channel transmission bandwidth sizes. Specific signaling parsing is as shown in Table 4 below:

TABLE 4

| Data channel transmission bandwidth indication information | Data channel transmission bandwidth size |
|---|---|
| 00 | Full bandwidth |
| 01 | ½ bandwidth |
| 10 | ¼ bandwidth |
| 11 | Reserved |

The terminal determines a specific position of the continuous frequency domain resources (that is, the data channel transmission bandwidth) within the system bandwidth according to the indication information by using the following method: the terminal determines a RB index of a RB allocated by the network side for the data channel according to the frequency domain resource allocation information, and determines a subband range in which data transmission resides (that is, an exact frequency domain position of the data channel transmission bandwidth) according to the RB index. The subband range is predefined by the following Table 5. For example, if RB indexes of RBs occupied by a PDSCH of UE #1 are 45~120 and the data channel transmission bandwidth size indicated by the data channel transmission bandwidth indication information is ½ bandwidth, UE #1 can learn that the data channel transmission bandwidth is BW #0, and the subband range thereof is RB #0~RB #125.

TABLE 5

| Data channel bandwidth indication (11 is reserved) | 00 Full bandwidth | 01 ½ bandwidth | 10 ¼ bandwidth |
|---|---|---|---|
| RB range of data channel transmission bandwidth | 0~249 | BW#0: 0~125<br>BW#1: 126~249 | BW#0: 0~63 or 0~62<br>BW#1: 64~125 or 63~125<br>BW#2: 126~189 or 126~186<br>BW#3: 189~249 or 187~249 |

Frequency domain resource allocation of the multiple PDSCHs cannot be greater than the data channel transmission bandwidth indicated by the DCI.

After the terminal determines the data channel transmission bandwidth size and position, the terminal can perform IFFT (Inverse Fast Fourier Transform) on data derived from waveform detection according to the determined data channel transmission bandwidth size and position, to recover modulation symbols.

This solution can also be applied to more data channel transmission subbands. For example, if the minimum transmission bandwidth is ⅛ of the system bandwidth, an indication field with a size of 3 bits is required to indicate corresponding data channel transmission bandwidth indication information, which is not limited herein.

Example 2: as described in Example 1. After the terminal obtains the data channel transmission bandwidth size from the data channel transmission bandwidth indication information carried in the DCI, (1) the terminal can determine a frequency domain position of the data channel transmission bandwidth within the system bandwidth according to the following rule (corresponding to the abovementioned method 2).

The data channel transmission bandwidth indication information carried in the DCI is used for indicating the data channel transmission bandwidth size and the frequency domain position of the bandwidth, and the length of the indication field of the data channel transmission bandwidth indication information is N bits.

When N=2 bits: starting points of all predefined data channel transmission bandwidths can be the same, for example, all predefined data channel transmission bandwidths start from RB #0. When the data channel transmission bandwidth indication information indicates full bandwidth, the frequency domain position of the bandwidth is RB #0~249; when the data channel transmission bandwidth indication information indicates ½ bandwidth, the frequency domain position of the bandwidth is RB #0~125; when the data channel bandwidth indication information indicates ¼ bandwidth, the frequency domain position of the bandwidth is RB #0~63. Specifically, the method can be described with reference to Table 6 below.

TABLE 6

|    | Data channel transmission bandwidth | Data channel transmission bandwidth position |
|----|-------------------------------------|----------------------------------------------|
| 00 | Full bandwidth                      | 0~249                                        |
| 01 | ½ bandwidth                         | 0~125                                        |
| 10 | ¼ bandwidth                         | 0~63 or 0~62                                 |
| 11 | Reserved                            | Reserved                                     |

When N=3 bits, the data channel transmission bandwidth size and frequency domain position of the data channel transmission bandwidth can be determined with reference to the following Table 7:

TABLE 7

|     | Data channel transmission bandwidth | Data channel transmission bandwidth position |
|-----|-------------------------------------|----------------------------------------------|
| 000 | Full bandwidth                      | 0~M − 1                                      |
| 001 | ½ bandwidth                         | 0~[M/2] or 0~⌊M/2⌋                           |
| 010 | ½ bandwidth                         | [M/2] + 1~M − 1 or [M/2] + 1~M − 1           |
| 011 | ¼ bandwidth                         | 0~[M/4] or 0~⌊M/4⌋                           |
| 100 | ¼ bandwidth                         | [M/4] + 1~[M/2] or ⌊M/4⌋ + 1~⌊M/2⌋           |
| 101 | ¼ bandwidth                         | [M/2] + 1~3 × [M/4] or [M/2] + 1~3 × ⌊M/4⌋   |
| 110 | ¼ bandwidth                         | 3 × [M/4] + 1~M − 1 or 3 × ⌊M/4⌋ + 1~M − 1   |
| 111 | Reserved                            | Reserved                                     |

(2) Or, the data channel transmission bandwidth indication information in the DCI is only used for indicating the data channel transmission bandwidth size, and frequency domain positions of the data channel transmission bandwidths of different sizes are determined in a manner predefined in a protocol (corresponding to the above method 3). For example, the correspondence is: full bandwidth corresponds to a range of 0~M−1; ½ bandwidth corresponds to a range of 0~⌈M/2⌉ or 0~⌊M/2⌋; ¼ bandwidth corresponds to a range of 0~⌈M/4⌉ or 0~⌊M/4⌋.

That is, as long as the terminal obtains the data channel transmission bandwidth indication information, the terminal can further know a resource position of the data channel transmission bandwidth within the system bandwidth.

This solution can also be applied to more data channel transmission subbands. For example, if the minimum transmission bandwidth is ⅛ of the system bandwidth, at least an indication field with a size of 3 bits is required to indicate corresponding data channel transmission bandwidth indication information, which is not limited herein.

Example 3: as in Example 1 and Example 2, further, the base station side and the terminal side determine the resource granularity used for frequency domain resource allocation according to the data channel transmission bandwidth indication information. For example, taking the above assumption as an example, when the data channel transmission bandwidth size is ¼ bandwidth, the resource allocation granularity can be 1 RB; when the data channel transmission bandwidth size is ½ bandwidth, the resource allocation granularity can be 2 RBs; when the data channel transmission bandwidth size is full bandwidth, the resource allocation granularity can be 4 RBs, but the present disclosure is not limited thereto.

Example 4: as in examples 1 to 3, where example 1 or example 2 or a combination of one of example 1 or example 2 and example 3 can be applied to downlink data scheduling, and can also be applied to uplink data scheduling (e.g., data channel transmission bandwidth indication is carried in uplink scheduling signaling, specifically for the uplink shared channel PUSCH).

It can be seen from the above that the solution provided by the embodiments of the present disclosure involves: the base station carries the data channel transmission bandwidth indication information in the DCI, and determines, through a certain rule, the frequency domain resource position of the data channel transmission bandwidth within the system bandwidth; correspondingly, the terminal receives scheduling information (i.e., DCI), and determines the data channel transmission bandwidth size and position according to the scheduling information and the rule corresponding to the base station side; subsequently, the terminal can correctly receive the data transmitted by the base station according to the data channel transmission bandwidth size and position, and complete a signal processing process.

In summary, the embodiments of the present disclosure provide a data channel transmission bandwidth determination method, which can be specifically a data scheduling method using a DFT-s-OFDM waveform. According to this method, it can be ensured that the terminal can complete the data processing process smoothly and system performance is ensured.

It is noted that a satellite communication system still needs a base station and a terminal, although equipment thereof may have varied forms; for example, there are several gateway stations on the ground, which practically function as base stations; the terminal is mainly vehicle-borne equipment, but can also be a handheld device, which is not limited herein.

Figure 3:
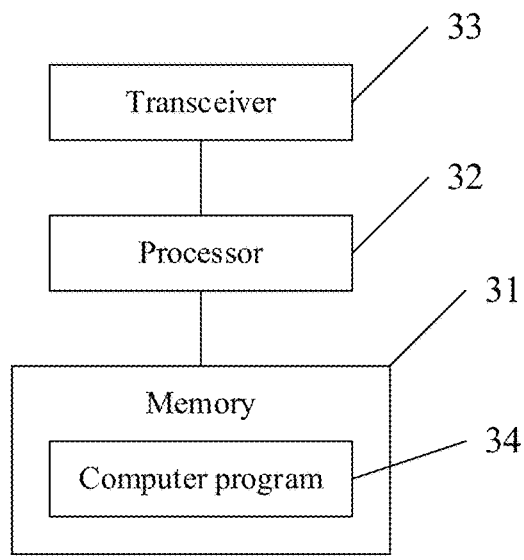
FIG. 3 is a schematic structural diagram of a network side device according to an embodiment of the disclosure.

An embodiment of the present disclosure further provides a network side device. As shown in FIG. 3, the network side device includes: a memory 31, a processor 32, a transceiver 33 and a program 34 stored in the memory 31 and executable by the processor 32, where the processor 32 is configured to execute the program to implement the following step:

transmitting, to a terminal through the transceiver 33, scheduling information for scheduling data channel transmission;

where the scheduling information includes data channel transmission bandwidth indication information.

The scheduling information may be downlink scheduling information or uplink scheduling information, which is not limited herein.

In the network side device provided by the embodiment of the present disclosure, scheduling information for scheduling data channel transmission is transmitted to a terminal, where the scheduling information includes data channel transmission bandwidth indication information, so that the terminal may determine the data channel transmission bandwidth information (size, or, size and position) according to the data channel transmission bandwidth indication information, thereby ensuring that the terminal smoothly completes a data processing process and ensuring system performance; and the problem in the related art that the terminal side cannot know the data channel transmission bandwidth when multiple downlink data channels coexist and frequency domain resources of the multiple downlink data channels are continuous or discontinuous may be solved.

Specifically, there is a first correspondence between the data channel transmission bandwidth indication information and a data channel transmission bandwidth size, and there is a second correspondence between the data channel transmission bandwidth size and a data channel transmission bandwidth position.

Further, the processor is further configured to, before transmitting, to the terminal, scheduling information for scheduling data channel transmission, agree on the first correspondence and the second correspondence with the terminal.

Correspondingly, the processor is specifically configured to transmit, to the terminal, the scheduling information for scheduling data channel transmission according to the first correspondence and the second correspondence.

The data channel transmission bandwidth indication information includes N bits, where N is a positive integer greater than 1; the data channel transmission bandwidth indication information may indicate $2^N$ types of different status information, where each type of status information corresponds to one data channel transmission bandwidth size, or each type of status information corresponds to one data channel transmission bandwidth size and one data channel transmission bandwidth position.

Specifically, an indication field of the data channel transmission bandwidth indication information is located before a frequency domain resource indication field.

The data channel transmission bandwidth indication information in the embodiment of the present disclosure is used for indicating the data channel transmission bandwidth information. Specifically, the data channel transmission bandwidth information may be the data channel transmission bandwidth size (case I) or the data channel transmission bandwidth size and position (case II);

for the case I, in the embodiment of the present disclosure, another message can be used for informing the terminal of the data channel transmission bandwidth position (measure I), or the data channel transmission bandwidth position can be determined in a manner predefined by the network side device and the terminal (e.g., a rule for determining the data channel transmission bandwidth position is agreed on in advance) (measure II):

for the case I, the data channel transmission bandwidth indication information is used for indicating the data channel transmission bandwidth size.

Regarding the measure I, the processor is further configured to transmit, to the terminal through the transceiver, frequency domain resource allocation information; where the frequency domain resource allocation information includes an index of a resource block in a frequency domain resource allocated to a data channel.

Further, the processor is further configured to, if the index of the resource block occupies at least two data channel transmission bandwidth positions in the second correspondence, adjust the data channel transmission bandwidth size according to the data channel transmission bandwidth positions occupied by the index of the resource block, and determine a data channel transmission bandwidth position corresponding to the adjusted data channel transmission bandwidth size.

Regarding the measure II, the second correspondence includes determination information of the data channel transmission bandwidth position corresponding to the data channel transmission bandwidth size.

Specifically, the determination information includes information of a mapped position, in an entire transmission bandwidth, of a preset position in the data channel transmission bandwidth position.

For the case II, the data channel transmission bandwidth indication information is further used for indicating the data channel transmission bandwidth position.

Further, the processor is further configured to determine, according to the data channel transmission bandwidth indication information, a resource granularity used for frequency domain resource allocation.

Further, the processor is further configured to transmit data, to the terminal through the transceiver, according to the data channel transmission bandwidth indication information, the first correspondence and the second correspondence.

In the embodiment of the present disclosure, the data channel transmission bandwidth is a total bandwidth occupied by multiple data channels simultaneously transmitted in one slot.

The implementation embodiments of the above-mentioned data channel transmission bandwidth determination method performed by the network side device are all applicable to the embodiments of the network side device, and the same technical effect can also be achieved.

Figure 4:
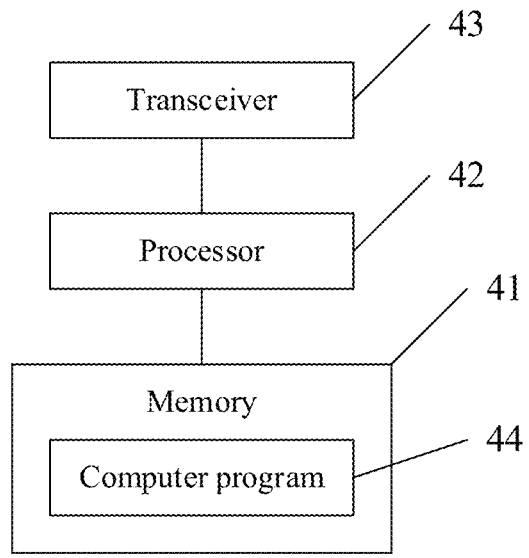
FIG. 4 is a schematic structural diagram of a terminal according to an embodiment of the disclosure.

An embodiment of the present disclosure further provides a terminal. As shown in FIG. 4, the terminal includes: a memory 41, a processor 42, a transceiver 43 and a program 44 stored in the memory 41 and executable by the processor 42, where the processor 42 is configured to executes the program to implement the following steps:

receiving scheduling information, transmitted by a network side device, for scheduling data channel transmission through the transceiver 43; where the scheduling information includes data channel transmission bandwidth indication information;

determining data channel transmission bandwidth information according to the data channel transmission bandwidth indication information.

The scheduling information may be downlink scheduling information or uplink scheduling information, which is not limited herein. The data channel transmission bandwidth information includes the data channel transmission bandwidth size, or the data channel transmission bandwidth size and the data channel transmission bandwidth position, but the present disclosure is not limited thereto.

In the terminal provided by the embodiment of the present disclosure, scheduling information, transmitted by a network side device, for scheduling data channel transmission is received; where the scheduling information includes data channel transmission bandwidth indication information. The data channel transmission bandwidth information is determined according to the data channel transmission bandwidth indication information, thereby ensuring that the data channel transmission bandwidth may be known when multiple downlink data channels coexist and frequency domain resources of the multiple downlink data channels are continuous or discontinuous, thereby ensuring that a data processing process may be smoothly completed and ensuring system performance; and the problem in the related art that the terminal side cannot know the data channel transmission bandwidth when multiple downlink data channels coexist and frequency domain resources of the multiple downlink data channels are continuous or discontinuous may be solved.

Specifically, there is a first correspondence between the data channel transmission bandwidth indication information and a data channel transmission bandwidth size, and there is a second correspondence between the data channel transmission bandwidth size and a data channel transmission bandwidth position.

Further, the processor is further configured to, before receiving scheduling information, transmitted by the network side device, for scheduling data channel transmission, agree on the first correspondence and the second correspondence with the network side device.

Correspondingly, the processor is specifically configured to determine the data channel transmission bandwidth information according to the data channel transmission bandwidth indication information, the first correspondence and the second correspondence.

The data channel transmission bandwidth indication information includes N bits, where N is a positive integer greater than 1; the data channel transmission bandwidth indication information may indicate $2^N$ types of different status information, where each type of status information corresponds to one data channel transmission bandwidth size, or each type of status information corresponds to one data channel transmission bandwidth size and one data channel transmission bandwidth position.

Specifically, an indication field of the data channel transmission bandwidth indication information is located before a frequency domain resource indication field.

The data channel transmission bandwidth indication information in the embodiment of the present disclosure is used for indicating the data channel transmission bandwidth information. Specifically, the data channel transmission bandwidth information may be the data channel transmission bandwidth size (case I) or the data channel transmission bandwidth size and position (case II);

for the case I, in the embodiment of the present disclosure, the data channel transmission bandwidth position can be known by means of another message (measure I), or the data channel transmission bandwidth position can be determined in a manner predefined by the terminal and the network side device (e.g., a rule for determining the data channel transmission bandwidth position is agreed on in advance) (measure II):

for the case I, the data channel transmission bandwidth indication information is used for indicating the data channel transmission bandwidth size.

Regarding the measure I, the processor is specifically configured to determine the data channel transmission bandwidth size according to the data channel transmission bandwidth indication information and the first correspondence.

Further, the processor is further configured to receive, through the transceiver, frequency domain resource allocation information transmitted by the network side device, where the frequency domain resource allocation information includes an index of a resource block in a frequency domain resource allocated to a data channel; and determine the data channel transmission bandwidth position according to the determined data channel transmission bandwidth size, the index of the resource block and the second correspondence.

Specifically, the processor is specifically configured to, if the index of the resource block occupies at least two data channel transmission bandwidth positions in the second correspondence, adjust the determined data channel transmission bandwidth size according to the data channel transmission bandwidth positions occupied by the index of the resource block, and determine a data channel transmission bandwidth position corresponding to the adjusted data channel transmission bandwidth size.

Regarding the measure II, the processor is further configured to, after determining the data channel transmission bandwidth size according to the data channel transmission bandwidth indication information and the first correspondence, determine the data channel transmission bandwidth position according to the determined data channel transmission bandwidth size and the second correspondence; where the second correspondence includes determination information of the data channel transmission bandwidth position corresponding to the data channel transmission bandwidth size.

Specifically, the determination information includes information of a mapped position, in an entire transmission bandwidth, of a preset position in the data channel transmission bandwidth position.

For the case II, the data channel transmission bandwidth indication information is further used for indicating the data channel transmission bandwidth position.

Specifically, the processor is specifically configured to determine the data channel transmission bandwidth size and the data channel transmission bandwidth position according to the data channel transmission bandwidth indication information, the first correspondence and the second correspondence.

Further, the processor is further configured to determine, according to the data channel transmission bandwidth indication information, a resource granularity used for frequency domain resource allocation.

Further, the processor is further configured to, after receiving scheduling information, transmitted by the network side device, for scheduling data channel transmission, receive, through the transceiver, data transmitted by the network side device according to the determined data channel transmission bandwidth size and the determined data channel transmission bandwidth position.

The implementation embodiments of the above-mentioned data channel transmission bandwidth determination method performed by the terminal are all applicable to the embodiments of the terminal, and the same technical effect can also be achieved.

An embodiment of the present disclosure further provides a computer readable storage medium storing a program thereon, where the program is configured to be executed by a processor to implement steps of the above data channel transmission bandwidth determination method performed by the network side device; or the program is configured to be executed by a processor to implement steps of the above data channel transmission bandwidth determination method performed by the terminal.

The implementation embodiments of the above-mentioned data channel transmission bandwidth determination method performed by the terminal or the network side device are all applicable to the embodiments of the computer readable storage medium, and the same technical effect can also be achieved.

Figure 5:
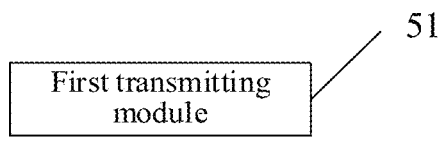
FIG. 5 is a first schematic structural diagram of a data channel transmission bandwidth determination apparatus according to an embodiment of the present disclosure.

An embodiment of the present disclosure further provides a data channel transmission bandwidth determination apparatus applied to a network side device. As shown in FIG. 5, the apparatus includes:

a first transmitting module 51, configured to transmit, to a terminal, scheduling information for scheduling data channel transmission;

where the scheduling information includes data channel transmission bandwidth indication information.

The scheduling information may be downlink scheduling information or uplink scheduling information, which is not limited herein.

In the data channel transmission bandwidth determination apparatus provided by the embodiment of the present disclosure, scheduling information for scheduling data channel transmission is transmitted to a terminal, where the scheduling information includes data channel transmission bandwidth indication information, so that the terminal may determine the data channel transmission bandwidth information (size, or, size and position) according to the data channel transmission bandwidth indication information, thereby ensuring that the terminal smoothly completes a data processing process and ensuring system performance; and the problem in the related art that the terminal side cannot know the data channel transmission bandwidth when multiple downlink data channels coexist and frequency domain resources of the multiple downlink data channels are continuous or discontinuous may be solved.

Specifically, there is a first correspondence between the data channel transmission bandwidth indication information and a data channel transmission bandwidth size, and there is a second correspondence between the data channel transmission bandwidth size and a data channel transmission bandwidth position.

Further, the data channel transmission bandwidth determination apparatus further includes: a first agreeing module, configured to, before transmitting, to the terminal, scheduling information for scheduling data channel transmission, agree on the first correspondence and the second correspondence with the terminal.

Correspondingly, the first transmitting module includes: a first transmitting submodule, configured to transmit, to the terminal, the scheduling information for scheduling data channel transmission according to the first correspondence and the second correspondence.

The data channel transmission bandwidth indication information includes N bits, where N is a positive integer greater than 1; the data channel transmission bandwidth indication information may indicate $2^N$ types of different status information, where each type of status information corresponds to one data channel transmission bandwidth size, or each type of status information corresponds to one data channel transmission bandwidth size and one data channel transmission bandwidth position.

Specifically, an indication field of the data channel transmission bandwidth indication information is located before a frequency domain resource indication field.

The data channel transmission bandwidth indication information in the embodiment of the present disclosure is used for indicating the data channel transmission bandwidth information. Specifically, the data channel transmission bandwidth information may be the data channel transmission bandwidth size (case I) or the data channel transmission bandwidth size and position (case II);

for the case I, in the embodiment of the present disclosure, another message can be used for informing the terminal of the data channel transmission bandwidth position (measure I), or the data channel transmission bandwidth position can be determined in a manner predefined by the network side device and the terminal (e.g., a rule for determining the data channel transmission bandwidth position is agreed on in advance) (measure II):

for the case I, the data channel transmission bandwidth indication information is used for indicating the data channel transmission bandwidth size.

Regarding the measure I, the data channel transmission bandwidth determination apparatus further includes: a second transmitting module, configured to transmit frequency domain resource allocation information to the terminal; where the frequency domain resource allocation information includes an index of a resource block in a frequency domain resource allocated to a data channel.

Further, the data channel transmission bandwidth determination apparatus further includes: a first processing module, configured to, if the index of the resource block occupies at least two data channel transmission bandwidth positions in the second correspondence, adjust the data channel transmission bandwidth size according to the data channel transmission bandwidth positions occupied by the index of the resource block, and determine a data channel transmission bandwidth position corresponding to the adjusted data channel transmission bandwidth size.

Regarding the measure II, the second correspondence includes determination information of the data channel transmission bandwidth position corresponding to the data channel transmission bandwidth size.

Specifically, the determination information includes information of a mapped position, in an entire transmission bandwidth, of a preset position in the data channel transmission bandwidth position.

For the case II, the data channel transmission bandwidth indication information is further used for indicating the data channel transmission bandwidth position.

Further, the data channel transmission bandwidth determination apparatus further includes: a first determining module, configured to determine, according to the data channel transmission bandwidth indication information, a resource granularity used for frequency domain resource allocation.

Further, the data channel transmission bandwidth determination apparatus further includes: a third transmitting module, configured to transmit data to the terminal according to the data channel transmission bandwidth indication information, the first correspondence and the second correspondence.

In the embodiment of the present disclosure, the data channel transmission bandwidth is a total bandwidth occupied by multiple data channels simultaneously transmitted in one slot.

The implementation embodiments of the above-mentioned data channel transmission bandwidth determination method performed by the network side device are all applicable to the embodiments of the data channel transmission bandwidth determination apparatus, and the same technical effect can also be achieved.

Figure 6:
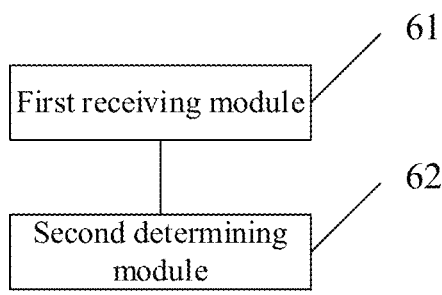
FIG. 6 is a second schematic structural diagram of a data channel transmission bandwidth determination apparatus according to an embodiment of the present disclosure.

An embodiment of the present disclosure further provides a data channel transmission bandwidth determination apparatus applied to a terminal. As shown in FIG. 6, the apparatus includes:

a first receiving module 61, configured to receive scheduling information, transmitted by a network side device, for scheduling data channel transmission; where the scheduling information includes data channel transmission bandwidth indication information;

a second determining module 62, configured to determine data channel transmission bandwidth information according to the data channel transmission bandwidth indication information.

The scheduling information may be downlink scheduling information or uplink scheduling information, which is not limited here. The data channel transmission bandwidth information includes the data channel transmission bandwidth size, or the data channel transmission bandwidth size and the data channel transmission bandwidth position, but the present disclosure is not limited thereto.

In the data channel transmission bandwidth determination apparatus provided by the embodiment of the present disclosure, scheduling information, transmitted by a network side device, for scheduling data channel transmission is received; where the scheduling information includes data channel transmission bandwidth indication information. The data channel transmission bandwidth information is determined according to the data channel transmission bandwidth indication information, thereby ensuring that the data channel transmission bandwidth may be known when multiple downlink data channels coexist and frequency domain resources of the multiple downlink data channels are continuous or discontinuous, thereby ensuring that a data processing process may be smoothly completed and ensuring system performance; and the problem in the related art that the terminal side cannot know the data channel transmission bandwidth when multiple downlink data channels coexist and frequency domain resources of the multiple downlink data channels are continuous or discontinuous may be solved.

Specifically, there is a first correspondence between the data channel transmission bandwidth indication information and a data channel transmission bandwidth size, and there is a second correspondence between the data channel transmission bandwidth size and a data channel transmission bandwidth position.

Further, the data channel transmission bandwidth determination apparatus further includes: a second agreeing module, configured to, before receiving scheduling information, transmitted by the network side device, for scheduling data channel transmission, agree on the first correspondence and the second correspondence with the network side device.

Correspondingly, the second determining module includes: a first determining submodule, configured to determine the data channel transmission bandwidth information according to the data channel transmission bandwidth indication information, the first correspondence and the second correspondence.

The data channel transmission bandwidth indication information includes N bits, where N is a positive integer greater than 1; the data channel transmission bandwidth indication information may indicate $2^N$ types of different status information, where each type of status information corresponds to one data channel transmission bandwidth size, or each type of status information corresponds to one data channel transmission bandwidth size and one data channel transmission bandwidth position.

Specifically, an indication field of the data channel transmission bandwidth indication information is located before a frequency domain resource indication field.

The data channel transmission bandwidth indication information in the embodiment of the present disclosure is used for indicating the data channel transmission bandwidth information. Specifically, the data channel transmission bandwidth information may be the data channel transmission bandwidth size (case I) or the data channel transmission bandwidth size and position (case II);

for the case I, in the embodiment of the present disclosure, the data channel transmission bandwidth position can be known by means of another message (measure I), or the data channel transmission bandwidth position can be determined in a manner predefined by the terminal and the network side device (e.g., a rule for determining the data channel transmission bandwidth position is agreed on in advance) (measure II):

for the case I, the data channel transmission bandwidth indication information is used for indicating the data channel transmission bandwidth size.

Regarding the measure I, the second determining module includes: a second determining submodule, configured to determine the data channel transmission bandwidth size according to the data channel transmission bandwidth indication information and the first correspondence.

Further, the data channel transmission bandwidth determination apparatus further includes: a second receiving module, configured to receive frequency domain resource allocation information transmitted by the network side device; where the frequency domain resource allocation information includes an index of a resource block in a frequency domain resource allocated to a data channel; a third determining module, configured to determine the data channel transmission bandwidth position according to the determined data channel transmission bandwidth size, the index of the resource block and the second correspondence.

Specifically, the third determining module includes: a first processing submodule, configured to, if the index of the resource block occupies at least two data channel transmission bandwidth positions in the second correspondence, adjust the determined data channel transmission bandwidth size according to the data channel transmission bandwidth positions occupied by the index of the resource block, and determine a data channel transmission bandwidth position corresponding to the adjusted data channel transmission bandwidth size.

Regarding the measure II, the data channel transmission bandwidth determination apparatus further includes: a fourth determining module, configured to, after determining the data channel transmission bandwidth size according to the data channel transmission bandwidth indication information and the first correspondence, determine the data channel transmission bandwidth position according to the determined data channel transmission bandwidth size and the second correspondence; the second correspondence includes determination information of the data channel transmission bandwidth position corresponding to the data channel transmission bandwidth size.

Specifically, the determination information includes information of a mapped position, in an entire transmission bandwidth, of a preset position in the data channel transmission bandwidth position.

For the case II, the data channel transmission bandwidth indication information is further used for indicating the data channel transmission bandwidth position.

Specifically, the second determining module includes: a third determining submodule, configured to determine the data channel transmission bandwidth size and the data channel transmission bandwidth position according to the data channel transmission bandwidth indication information, the first correspondence and the second correspondence.

Further, the data channel transmission bandwidth determination apparatus further includes: a fifth determining module, configured to determine, according to the data channel transmission bandwidth indication information, a resource granularity used for frequency domain resource allocation.

Further, the data channel transmission bandwidth determination apparatus further includes: a third receiving module, configured to, after receiving the scheduling information, transmitted by the network side device, for scheduling data channel transmission, receive data transmitted by the network side device according to the determined data channel transmission bandwidth size and the determined data channel transmission bandwidth position.

The implementation embodiments of the above-mentioned data channel transmission bandwidth determination method performed by the terminal are all applicable to the embodiments of the data channel transmission bandwidth determination apparatus, and the same technical effect can also be achieved.

It should be noted that many of functional components described in this specification are called modules/submodules, so as to more particularly emphasize independence of their implementation.

In the embodiments of the present disclosure, the modules/submodules may be implemented in software, so as to be executed by various types of processors. For example, an identified executable code module may include one or more physical or logical blocks of computer instructions, which may be constructed as objects, procedures, or functions, for example. Nevertheless, executable code of the identified module does not need to be physically located together, but may include different instructions stored in different locations. When these instructions are logically combined together, they constitute a module and achieve a specified purpose of the module.

In fact, the executable code module may be a single instruction or many instructions, and may even be distributed on multiple different code segments, distributed among different programs, and distributed across multiple storage devices. Likewise, operational data can be identified within the module, and can be implemented in any appropriate form and organized within any suitable type of data structure. The operation data may be collected as a single data set, or may be distributed in different locations (including on different storage devices), and may exist, at least in part, only as an electronic signal on a system or network.

When the module is implemented by software, considering conventional hardware process level, the function corresponding to the module implemented in software may be alternatively implemented by a corresponding hardware circuit built by a person skilled in the art if the cost is not considered. The hardware circuit includes a conventional very large scale integration (VLSI) circuit or a gate array and conventional semiconductors such as logic chips and transistors or other discrete elements. The module may also be implemented with programmable hardware devices, such as field programmable gate arrays, programmable array logic, and programmable logic devices.

The foregoing descriptions are merely optional implementations of the present disclosure. It should be noted that a person of ordinary skill in the art may make several improvements or modifications without departing from the principle of this disclosure, and the improvements and modifications shall be deemed as falling within the scope of the present disclosure.

What is claimed is:

1. A data channel transmission bandwidth determination method, performed by a network side device, comprising:
    transmitting, to a terminal, scheduling information for scheduling data channel transmission;
    wherein the scheduling information comprises data channel transmission bandwidth indication information;
    wherein,
    there is a first correspondence between the data channel transmission bandwidth indication information and a data channel transmission bandwidth size, and there is a second correspondence between the data channel transmission bandwidth size and a data channel transmission bandwidth position; wherein the first correspondence and the second correspondence are agreed on in advance.

2. The data channel transmission bandwidth determination method according to claim 1, wherein the transmitting, to the terminal, the scheduling information for scheduling the data channel transmission comprises:
    transmitting, to the terminal, the scheduling information for scheduling the data channel transmission according to the first correspondence and the second correspondence;
    and/or,
    wherein the data channel transmission bandwidth indication information is used for indicating the data channel transmission bandwidth size;
    and/or,
    wherein, the method further comprises:
    transmitting data to the terminal according to the data channel transmission bandwidth indication information, the first correspondence and the second correspondence.

3. The data channel transmission bandwidth determination method according to claim 2, further comprising:
    transmitting frequency domain resource allocation information to the terminal;
    wherein the frequency domain resource allocation information comprises an index of a resource block in a frequency domain resource allocated to a data channel; in a case that the index of the resource block occupies at least two data channel transmission bandwidth positions in the second correspondence, adjusting the data channel transmission bandwidth size according to the data channel transmission bandwidth positions occupied by the index of the resource block, and determining a data channel transmission bandwidth position corresponding to the adjusted data channel transmission bandwidth size;
    and/or,
    wherein the second correspondence comprises determination information of the data channel transmission bandwidth position corresponding to the data channel transmission bandwidth size; wherein the determination information comprises information of a mapped position, in an entire transmission bandwidth, of a preset position in the data channel transmission bandwidth position;

and/or,
wherein the data channel transmission bandwidth indication information is further used for indicating the data channel transmission bandwidth position.

4. The data channel transmission bandwidth determination method according to claim 1, wherein, the data channel transmission bandwidth indication information comprises N bits, N being a positive integer greater than 1; the data channel transmission bandwidth indication information is to indicate 2N types of different status information, wherein each type of status information corresponds to one data channel transmission bandwidth size, or each type of status information corresponds to one data channel transmission bandwidth size and one data channel transmission bandwidth position;
and/or,
wherein an indication field of the data channel transmission bandwidth indication information is located before a frequency domain resource indication field;
and/or,
the method further comprises:
determining, according to the data channel transmission bandwidth indication information, a resource granularity used for frequency domain resource allocation;
and/or,
wherein the data channel transmission bandwidth is a total bandwidth occupied by multiple data channels simultaneously transmitted in one slot.

5. A data channel transmission bandwidth determination method, performed by a terminal, comprising:
receiving scheduling information, transmitted by a network side device, for scheduling data channel transmission; wherein the scheduling information comprises data channel transmission bandwidth indication information;
determining data channel transmission bandwidth information according to the data channel transmission bandwidth indication information;
wherein,
there is a first correspondence between the data channel transmission bandwidth indication information and a data channel transmission bandwidth size, and there is a second correspondence between the data channel transmission bandwidth size and a data channel transmission bandwidth position; wherein the first correspondence and the second correspondence are agreed on in advance.

6. The data channel transmission bandwidth determination method according to claim 5, wherein the determining the data channel transmission bandwidth information according to the data channel transmission bandwidth indication information comprises:
determining the data channel transmission bandwidth information according to the data channel transmission bandwidth indication information, the first correspondence and the second correspondence;
and/or,
wherein the data channel transmission bandwidth indication information is used for indicating the data channel transmission bandwidth size.

7. The data channel transmission bandwidth determination method according to claim 6, wherein the determining the data channel transmission bandwidth information according to the data channel transmission bandwidth indication information comprises:
determining the data channel transmission bandwidth size according to the data channel transmission bandwidth indication information and the first correspondence;
wherein the method further comprises: receiving frequency domain resource allocation information transmitted by the network side device; wherein the frequency domain resource allocation information comprises an index of a resource block in a frequency domain resource allocated to a data channel; determining the data channel transmission bandwidth position according to determined data channel transmission bandwidth size, the index of the resource block and the second correspondence; wherein the determining the data channel transmission bandwidth position according to the determined data channel transmission bandwidth size, the index of the resource block and the second correspondence comprises: in a case that the index of the resource block occupies at least two data channel transmission bandwidth positions in the second correspondence, adjusting the determined data channel transmission bandwidth size according to the data channel transmission bandwidth positions occupied by the index of the resource block, and determining a data channel transmission bandwidth position corresponding to the adjusted data channel transmission bandwidth size; wherein, after the receiving the scheduling information, transmitted by the network side device, for scheduling the data channel transmission, the method further comprises: receiving, according to determined data channel transmission bandwidth size and determined data channel transmission bandwidth position, data transmitted by the network side device; and/or,
wherein, after the determining the data channel transmission bandwidth information according to the data channel transmission bandwidth indication information and the first correspondence, the method further comprises: determining the data channel transmission bandwidth position according to determined data channel transmission bandwidth size and the second correspondence; wherein the second correspondence comprises determination information of the data channel transmission bandwidth position corresponding to the data channel transmission bandwidth size; wherein the determination information comprises information of a mapped position, in an entire transmission bandwidth, of a preset position in the data channel transmission bandwidth position; wherein, after the receiving the scheduling information, transmitted by the network side device, for scheduling the data channel transmission, the method further comprises: receiving, according to determined data channel transmission bandwidth size and determined data channel transmission bandwidth position, data transmitted by the network side device;
and/or,
wherein the data channel transmission bandwidth indication information is further used for indicating the data channel transmission bandwidth position, the determining the data channel transmission bandwidth information according to the data channel transmission bandwidth indication information comprises: determining the data channel transmission bandwidth size and the data channel transmission bandwidth position according to the data channel transmission bandwidth indication information, the first correspondence and the second correspondence; wherein, after the receiving the scheduling information, transmitted by the network side device, for scheduling the data channel transmission, the method further comprises: receiving, according to determined data channel transmission bandwidth size and determined data channel transmission bandwidth position, data transmitted by the network side device.

8. The data channel transmission bandwidth determination method according to claim 5, wherein, the data channel transmission bandwidth indication information comprises N bits, N being a positive integer greater than 1; the data channel transmission bandwidth indication information is to indicate 2N types of different status information, wherein each type of status information corresponds to one data channel transmission bandwidth size, or each type of status information corresponds to one data channel transmission bandwidth size and one data channel transmission bandwidth position;

and/or, wherein an indication field of the data channel transmission bandwidth indication information is located before a frequency domain resource indication field;

and/or, wherein the method further comprises:

determining, according to the data channel transmission bandwidth indication information, a resource granularity used for frequency domain resource allocation.

9. A terminal, comprising: a memory, a processor, a transceiver and a program stored in the memory and executable by the processor, wherein the processor is configured to execute the program to implement the steps of the method according to claim 5.

10. The terminal according to claim 9, wherein the processor is specifically configured to:

determine the data channel transmission bandwidth information according to the data channel transmission bandwidth indication information, the first correspondence and the second correspondence;

and/or, wherein the data channel transmission bandwidth indication information is used for indicating the data channel transmission bandwidth size.

11. The terminal according to claim 10, wherein the processor is specifically configured to:

determine the data channel transmission bandwidth size according to the data channel transmission bandwidth indication information and the first correspondence;

wherein the processor is further configured to: receive, through the transceiver, frequency domain resource allocation information transmitted by the network side device; wherein the frequency domain resource allocation information comprises an index of a resource block in a frequency domain resource allocated to the data channel; determine the data channel transmission bandwidth position according to determined data channel transmission bandwidth size, the index of the resource block and the second correspondence; wherein the processor is specifically configured to: in a case that the index of the resource block occupies at least two data channel transmission bandwidth positions in the second correspondence, adjust the determined data channel transmission bandwidth size according to the data channel transmission bandwidth positions occupied by the index of the resource block, and determine a data channel transmission bandwidth position corresponding to the adjusted data channel transmission bandwidth size; wherein the processor is further configured to: after receiving scheduling information, transmitted by the network side device, for scheduling data channel transmission, receive, through the transceiver according to determined data channel transmission bandwidth size and determined data channel transmission bandwidth position, data transmitted by the network side device; and/or, wherein the processor is further configured to: after determining the data channel transmission bandwidth size according to the data channel transmission bandwidth indication information and the first correspondence, determine the data channel transmission bandwidth position according to determined data channel transmission bandwidth indication information and the second correspondence; wherein the second correspondence comprises determination information of the data channel transmission bandwidth position corresponding to the data channel transmission bandwidth size; wherein the determination information comprises information of a mapped position, in an entire transmission bandwidth, of a preset position in the data channel transmission bandwidth position; wherein the processor is further configured to: after receiving scheduling information, transmitted by the network side device, for scheduling data channel transmission, receive, through the transceiver according to determined data channel transmission bandwidth size and determined data channel transmission bandwidth position, data transmitted by the network side device;

and/or, wherein the data channel transmission bandwidth indication information is further used for indicating the data channel transmission bandwidth position; wherein the processor is specifically configured to: determine the data channel transmission bandwidth size and the data channel transmission bandwidth position according to the data channel transmission bandwidth indication information, the first correspondence and the second correspondence; wherein the processor is further configured to: after receiving scheduling information, transmitted by the network side device, for scheduling data channel transmission, receive, through the transceiver according to determined data channel transmission bandwidth size and determined data channel transmission bandwidth position, data transmitted by the network side device.

12. The terminal according to claim 9, wherein, the data channel transmission bandwidth indication information comprises N bits, N being a positive integer greater than 1; the data channel transmission bandwidth indication information is to indicate 2N types of different status information, wherein each type of status information corresponds to one data channel transmission bandwidth size, or each type of status information corresponds to one data channel transmission bandwidth size and one data channel transmission bandwidth position;

and/or, wherein an indication field of the data channel transmission bandwidth indication information is located before a frequency domain resource indication field;

and/or, wherein the processor is further configured to:

determine, according to the data channel transmission bandwidth indication information, a resource granularity used for frequency domain resource allocation.

13. A network side device, comprising: a memory, a processor, a transceiver and a program stored in the memory and executable by the processor, wherein the processor is configured to execute the program to implement following steps:
- transmitting, to a terminal through the transceiver, scheduling information for scheduling data channel transmission;
- wherein the scheduling information comprises data channel transmission bandwidth indication information;
- wherein:
- there is a first correspondence between the data channel transmission bandwidth indication information and a data channel transmission bandwidth size, and there is a second correspondence between the data channel transmission bandwidth size and a data channel transmission bandwidth position; wherein the first correspondence and the second correspondence are agreed on in advance.

14. The network side device according to claim 13, wherein the processor is specifically configured to:
- transmit, to the terminal, the scheduling information for scheduling the data channel transmission according to the first correspondence and the second correspondence;
- and/or,
- wherein the data channel transmission bandwidth indication information is used for indicating the data channel transmission bandwidth size;
- and/or,
- wherein the processor is further configured to:
- transmit data to the terminal through the transceiver according to the data channel transmission bandwidth indication information, the first correspondence and the second correspondence.

15. The network side device according to claim 14, wherein the processor is further configured to:
- transmit frequency domain resource allocation information to the terminal through the transceiver;
- wherein the frequency domain resource allocation information comprises an index of a resource block in a frequency domain resource allocated to the data channel; wherein the processor is further configured to: in a case that the index of the resource block occupies at least two data channel transmission bandwidth positions in the second correspondence, adjust the data channel transmission bandwidth size according to the data channel transmission bandwidth positions occupied by the index of the resource block, and determine a data channel transmission bandwidth position corresponding to the adjusted data channel transmission bandwidth size;
- and/or,
- wherein the second correspondence comprises determination information of the data channel transmission bandwidth position corresponding to the data channel transmission bandwidth size; wherein the determination information comprises information of a mapped position, in an entire transmission bandwidth, of a preset position in the data channel transmission bandwidth position;
- and/or,
- wherein the data channel transmission bandwidth indication information is further used for indicating the data channel transmission bandwidth position.

16. The network side device according to claim 13, wherein, the data channel transmission bandwidth indication information comprises N bits, N being a positive integer greater than 1; the data channel transmission bandwidth indication information is to indicate 2N types of different status information, wherein each type of status information corresponds to one data channel transmission bandwidth size, or each type of status information corresponds to one data channel transmission bandwidth size and one data channel transmission bandwidth position;
- and/or,
- wherein an indication field of the data channel transmission bandwidth indication information is located before a frequency domain resource indication field;
- and/or,
- wherein the processor is further configured to:
- determine, according to the data channel transmission bandwidth indication information, a resource granularity used for frequency domain resource allocation;
- and/or,
- wherein the data channel transmission bandwidth is a total bandwidth occupied by multiple data channels simultaneously transmitted in one slot.

* * * * *